United States Patent
Pfeifer et al.

(10) Patent No.: US 11,689,626 B2
(45) Date of Patent: *Jun. 27, 2023

(54) TRANSPORT CHANNEL VIA WEB SOCKET FOR ODATA

(71) Applicant: SAP SE, Walldorf (DE)

(72) Inventors: Tatjiana Pfeifer, Altrip (DE); Andreas Hoffner, Waghäusel (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,628

(22) Filed: Sep. 20, 2021

(65) Prior Publication Data

US 2022/0006867 A1    Jan. 6, 2022

Related U.S. Application Data

(63) Continuation of application No. 16/856,999, filed on Apr. 23, 2020, now Pat. No. 11,223,686, which is a continuation of application No. 15/860,035, filed on Jan. 2, 2018, now Pat. No. 10,673,953.

(51) Int. Cl.
| | |
|---|---|
| *G06F 15/16* | (2006.01) |
| *H04L 67/14* | (2022.01) |
| *H04L 67/02* | (2022.01) |
| *H04L 67/1095* | (2022.01) |
| *G06F 9/00* | (2006.01) |

(52) U.S. Cl.
CPC .............. *H04L 67/14* (2013.01); *G06F 9/00* (2013.01); *H04L 67/02* (2013.01); *H04L 67/1095* (2013.01)

(58) Field of Classification Search
CPC ..... H04L 67/14; H04L 67/02; H04L 67/1095; G06F 9/00
USPC ......................................................... 709/219
See application file for complete search history.

(56) References Cited

U.S. PATENT DOCUMENTS

| | | | |
|---|---|---|---|
| 7,302,485 B2 | 11/2007 | Bauer et al. | |
| 7,957,287 B2 | 6/2011 | Venkatachalam | |
| 8,887,060 B2 * | 11/2014 | Maity | G06F 9/452 |
| | | | 715/740 |
| 9,026,635 B2 * | 5/2015 | Maity | H04L 67/02 |
| | | | 709/219 |
| 9,146,802 B2 | 9/2015 | Tran et al. | |

(Continued)

*Primary Examiner* — Moustafa M Meky
(74) *Attorney, Agent, or Firm* — Fish & Richardson P.C.

(57) ABSTRACT

The present disclosure involves systems, software, and computer implemented methods for providing an asynchronous transport channel for OData data using web sockets. One example method includes upgrading a HTTP connection to a web socket connection in response to an upgrade request. The web socket connection is maintained, after the upgrading, for receipt of subsequent web socket requests. An OData request is received, from a consuming application, over the web socket connection. The OData request is translated to a format used by an OData runtime environment and sent to the OData runtime environment. A response to the OData request is received from the OData runtime environment. The response is incorporated into a web socket message. The web socket message is sent to the consuming application, over the web socket connection, in response to the OData request, with the web socket connection remaining open after the web socket message is sent.

20 Claims, 6 Drawing Sheets

(56) References Cited

U.S. PATENT DOCUMENTS

| | | |
|---|---|---|
| 9,253,262 B2 | 2/2016 | Zhang et al. |
| 9,288,237 B2 | 3/2016 | Paller et al. |
| 9,356,804 B1 * | 5/2016 | Passaglia ................ H04L 67/63 |
| 9,513,929 B2 | 12/2016 | Pfeifer |
| 9,674,889 B2 | 6/2017 | Yu et al. |
| 10,004,061 B2 * | 6/2018 | Iwami ............... H04N 21/43637 |
| 10,057,217 B2 | 8/2018 | Lock et al. |
| 10,440,091 B2 | 10/2019 | Ban et al. |
| 10,455,026 B2 | 10/2019 | Wade et al. |
| 10,531,243 B2 * | 1/2020 | Park ..................... H04W 76/11 |
| 10,637,929 B1 * | 4/2020 | Rai ..................... H04L 63/0485 |
| 10,673,953 B2 * | 6/2020 | Pfeifer ................... H04L 67/02 |
| 11,223,686 B2 * | 1/2022 | Pfeifer ................... H04L 67/14 |
| 2005/0259673 A1 | 11/2005 | Lu et al. |
| 2008/0037480 A1 | 2/2008 | Venkatachalam |
| 2011/0171970 A1 | 7/2011 | Ishikawa |
| 2013/0067102 A1 | 3/2013 | Paller et al. |
| 2014/0207957 A1 | 7/2014 | Zhang et al. |
| 2014/0280756 A1 | 9/2014 | Maity et al. |
| 2015/0124763 A1 | 5/2015 | Yu et al. |
| 2016/0021064 A1 | 1/2016 | Lock et al. |
| 2016/0028646 A1 | 1/2016 | Fablet et al. |
| 2016/0057233 A1 * | 2/2016 | Scoda ................... H04L 67/141 |
| | | 709/227 |
| 2016/0142467 A1 | 5/2016 | Ban et al. |
| 2017/0230512 A1 | 8/2017 | Yu et al. |
| 2018/0035153 A1 * | 2/2018 | Yang ................... H04N 21/478 |
| 2019/0132276 A1 | 5/2019 | Scheiber et al. |
| 2019/0208022 A1 | 7/2019 | Pfeifer et al. |
| 2019/0281346 A1 * | 9/2019 | Park ..................... H04N 21/631 |
| 2020/0220936 A1 * | 7/2020 | Rai ..................... H04L 65/1069 |
| 2020/0252464 A1 | 8/2020 | Pfeifer et al. |
| 2020/0366809 A1 * | 11/2020 | Pekarske ............ H04N 1/00015 |

\* cited by examiner

| | HTTP OData | WebSocket OData |
|---|---|---|
| Request Service Document 304 | HTTP GET<br>http://services.odata.org/V2/OData/OData.svc/ — 306<br>Request Header — 308<br>Accept : application/json<br>Request Body — 310<br>n/a<br>302 | {<br>"header": {<br>"type": "request",<br>"resource": "/Northwind/Northwind.svc/",<br>"method": "GET",<br>"request-headers": [ — 314<br>{<br>"Accept": "application/json"<br>}<br>]<br>}<br>}<br>312 |
| Response Service Document | Status: 200 — 322<br>Response Header — 324<br>Content-Type : application/json<br>Response Body<br>{<br>"d": {<br>"EntitySets": [<br>"Categories"<br>]<br>}<br>}<br>326 | {<br>"header": {<br>"type": "response",<br>"resource": "/Northwind/Northwind.svc/",<br>"method": "GET",<br>"status": 200,<br>"response-headers": [<br>{<br>"Content-Type": "application/json"<br>}<br>]<br>},<br>"body": {<br>"d": {<br>"EntitySets": [<br>"Categories"<br>]<br>}<br>}<br>}<br>330 |

FIG. 3  300

| | HTTP OData | WebSocket OData |
|---|---|---|
| Request Single Resource | HTTP GET<br>http://services.odata.org/v2/OData/OData.svc/Categories(1) — 406<br>Request Header:<br>Accept : application/json<br>Request Body<br>n/a | {<br>"header":{<br>"type": "request",<br>"resource": "/Northwind/Northwind.svc/Categories(1)",<br>"method": "GET", — 414<br>"request-headers": [<br>{<br>"Accept": "application/json"<br>}<br>]<br>}<br>} 412 |
| | 404<br>408<br>410 402 | |
| Response Single Resource | Status: 200<br>Response Header:<br>Content-Type : application/json — 424<br>Response Body:<br>{<br>"d": {<br>"__metadata": {<br>"uri": "http://services.odata.org/V2/OData/OData.svc/Categories(1)",<br>"type": "ODataDemo.Category"<br>},<br>"ID": 1,<br>"Name": "Beverages",<br>"Products": {<br>"__deferred": {<br>"uri": "http://services.odata.org/V2/OData/OData.svc/Categories(1)/Products"<br>}<br>}<br>}<br>} | {<br>"header":{<br>"type": "request",<br>"resource": "/Northwind/Northwind.svc/Categories(1)",<br>"method": "GET",<br>"status": 200,<br>"response-headers": [<br>{<br>"Content-Type": "application/json"<br>}<br>]<br>},<br>"body": {<br>"d": {<br>"__metadata": {<br>"uri": "http://services.odata.org/V2/OData/OData.svc/Categories(1)",<br>"type": "ODataDemo.Category"<br>},<br>"ID": 1,<br>"Name": "Beverages",<br>"Products": {<br>"__deferred": {<br>"uri": "http://services.odata.org/V2/OData/OData.svc/Categories(1)/Products"<br>}<br>}<br>}<br>} 430 |
| | 422<br>426 420 | 432 |

FIG. 4 400

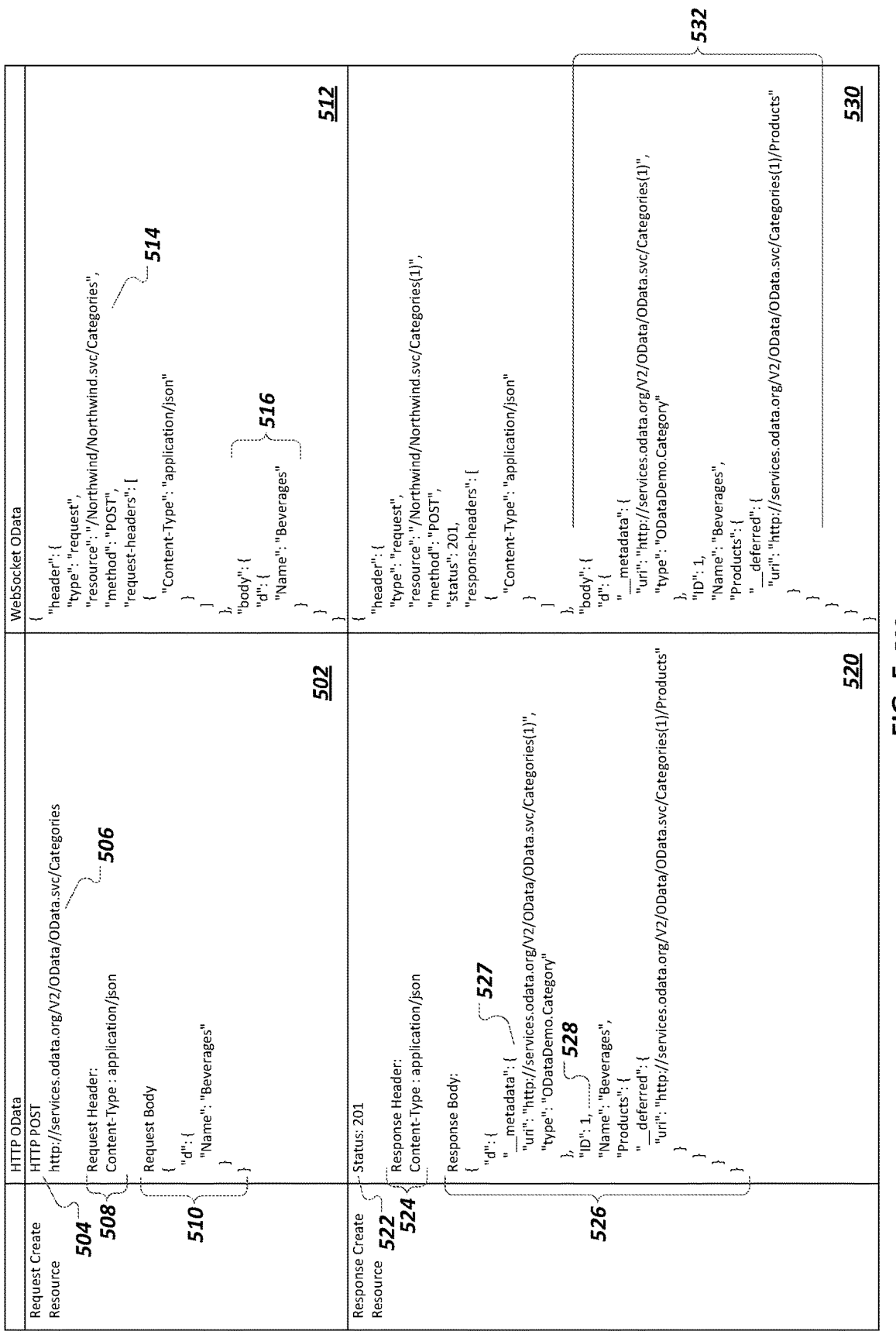

TRANSPORT CHANNEL VIA WEB SOCKET FOR ODATA

CLAIM OF PRIORITY

This application claims priority under 35 USC § 120 to U.S. patent application Ser. No. 16/856,999, filed on Apr. 23, 2020, titled "Transport Channel Via Web Socket for ODATA"; which claims priority under 35 USC § 120 to U.S. patent application Ser. No. 15/860,035, filed on Jan. 2, 2018, titled "Transport Channel Via Web Socket for ODATA" now issued as U.S. Pat. No. 10,673,953, Issued on Jun. 2, 2020; the entire contents of each and both, are hereby incorporated by reference.

TECHNICAL FIELD

The present disclosure relates to computer-implemented methods, software, and systems for providing an asynchronous transport channel for OData data using web sockets.

BACKGROUND

Computing devices can communicate with one another using either synchronous or asynchronous communication. With synchronous communication, a sender of a message waits for a receiver to receive and respond to the message before sending other messages. In some cases, the sender is blocked from performing other processing until the receiver responds to the message. With asynchronous communication, the sender may not need to wait for a response from the receiver before sending other messages or performing other processing. Asynchronous communication allows for the receiver to receive and process the message at a time chosen by the receiver.

SUMMARY

The present disclosure involves systems, software, and computer implemented methods for providing an asynchronous transport channel for OData data using web sockets. One example method includes upgrading a HTTP connection to a web socket connection in response to an upgrade request. The web socket connection is maintained, after the upgrading, for receipt of subsequent web socket requests. An OData request is received, from a consuming application, over the web socket connection. The OData request is translated to a format used by an OData runtime environment and sent to the OData runtime environment. A response to the OData request is received from the OData runtime environment. The response is incorporated into a web socket message. The web socket message is sent to the consuming application, over the web socket connection, in response to the OData request, with the web socket connection remaining open after the web socket message is sent.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates example code that includes a request for a service document, and a corresponding response, for both HTTP and web socket protocols.

FIG. 4 illustrates example code that includes a request for an OData resource, and a corresponding response, for both HTTP and web socket protocols.

FIG. 5 illustrates example code that includes a request to create an OData resource, and a corresponding response, for both HTTP and web socket protocols.

DETAILED DESCRIPTION

Figure 1:
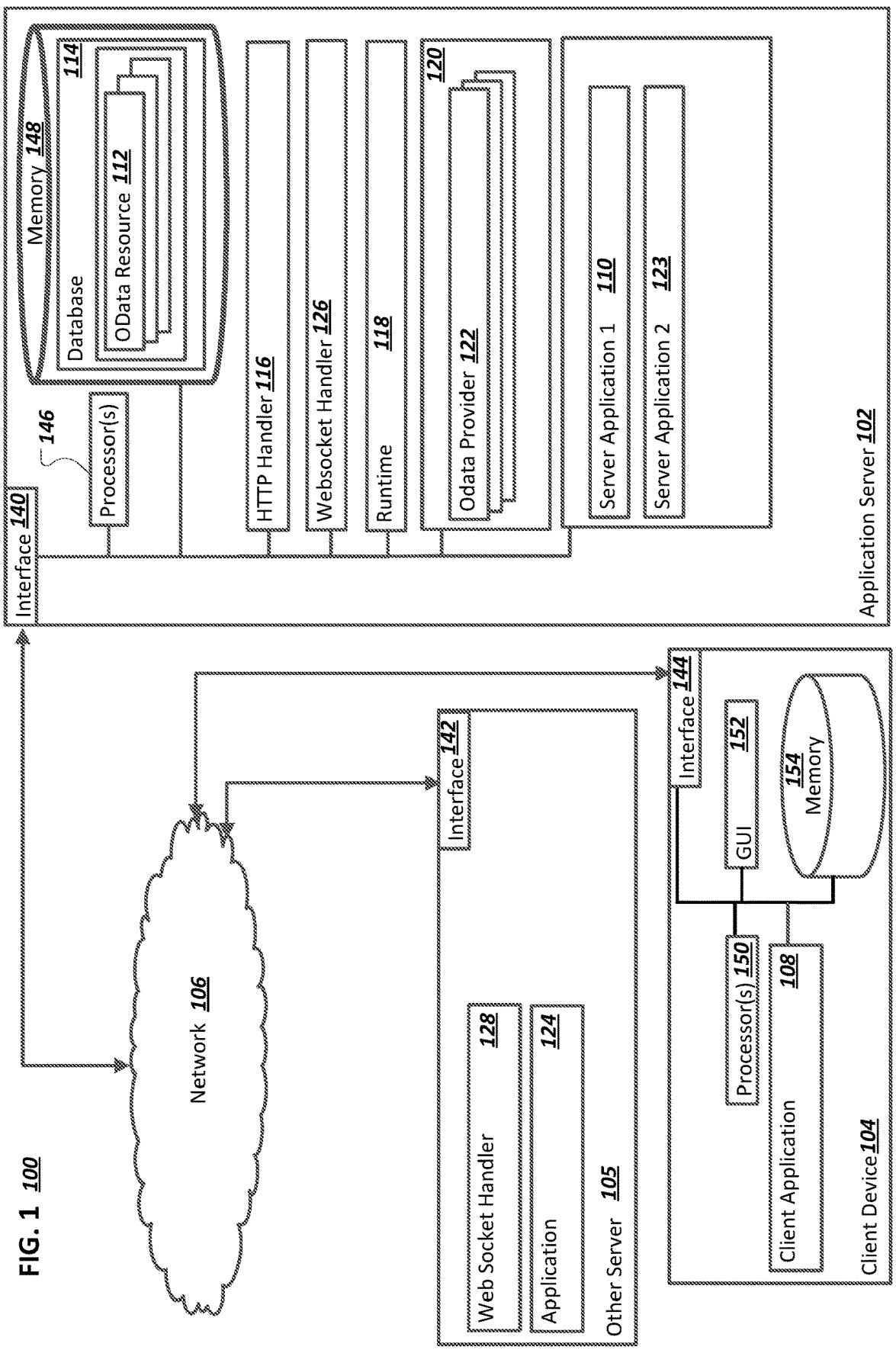
FIG. 1 is a block diagram illustrating an example system for providing an asynchronous transport channel for OData data using web sockets.

OData interfaces provided by an application server were initially designed to be exposed using synchronous HTTP (HyperText Transfer Protocol), which involves defined client and server roles and request/response processing. In doing so, a connection is established for each synchronous request and closed after a response is sent to a requesting device. Application developers may desire to access OData (Open Data) services using an asynchronous protocol rather than a synchronous protocol, using a connection that remains open, e.g., during a lifetime of an application instance. For example, a web socket handler can be added to an application server which can receive asynchronous requests from applications. Keeping a connection open can improve performance of the application server (e.g., load reduction) as compared to establishing and closing a connection for each request. Providing a web socket handler in the application server can enable asynchronous communication in a unified manner in a centralized location, as compared to consuming applications individually implementing asynchronous approaches, such as with polling techniques.

An open web socket connection can also be used by the application server to push data to an application. The application server can push event information, for example. In general, web socket technology enables other types of roles other than a traditional client/server relationship, such as server to client communication, server to server, application to application, etc.

The web socket handler can provide a unified way to exchange OData based on web sockets. The web socket handler can be configured to submit requests to a runtime component that interfaces with existing OData providers. The existing OData framework can be reused and leveraged without additional development effort. The application server can service OData requests received over a web socket connection by applying an established programming model to a web socket channel by reusing existing OData service implementations and frameworks. The application server may currently offer many existing OData service implementations, for example, which can each be leveraged, unchanged, for a new asynchronous communication paradigm. OData providers need not be aware of whether OData data they provide is provided to a consuming application over an HTTP or web socket connection.

The use of web sockets can simplify configuration tasks. Since a web socket connection can be used in both directions, push and pull scenarios can use the same communication technology and thereby use a same set of configuration data. A consumer application need only use one entry point for all data requests submitted by the consuming application. A Gateway runtime can be specialized to handle OData requests, rather than needing to be concerned with network communication details. The use of web sockets for OData can be beneficial for session management. For example, it may be beneficial for a consuming application to reuse the status of the consuming application on a server for subsequent requests (e.g., for drafts, or when complex calculations can be shared between different requests). With web sockets, the status of a server session can be maintained more easily than with synchronous HTTP, since, with web sockets, the session is attached to the web socket connection. Additional interaction of the consumer application with the server is not required to keep the session alive. With HTTP request/response processing, a session is, by default, terminated with the finalization of respective request processing. If the consuming application desires for the session to survive until a next request, the consuming application can provide an indication by using certain HTTP headers, and the server then can include certain response headers which are to be used by the consuming application with subsequent consumer requests. Session management with web sockets avoids the providing and receiving of such headers. With web sockets, consuming applications that keep sessions open can avoid using HTTP headers, which can reduce the amount of transferred data.

FIG. 1 is a block diagram illustrating an example system 100 for providing an asynchronous transport channel for OData data using web sockets. Specifically, the illustrated system 100 includes or is communicably coupled with an application server 102, a client device 104, an "other" (e.g., another) server 105, and a network 106. Although shown separately, in some implementations, functionality of two or more systems or servers may be provided by a single system or server. In some implementations, the functionality of one illustrated system or server may be provided by multiple systems or servers. Although a client/server architecture is illustrated, other types of environments, such as cloud and third party environments, that include provider frameworks, can be supported.

A client application 108 on the client device 104 is a client-side version of a server application 110 on the application server 102. The client application 108 can send a HTTP request, over the network 106, to the application server 102, for an OData resource 112 included in or generated from data in a database 114. A HTTP handler 116 can receive the HTTP request on a HTTP connection, and can translate the request into a format used by a runtime component 118 (e.g., a gateway runtime component). The runtime component 118 can be configured to interface with OData providers 120, including an OData provider 122 that is configured to retrieve the OData resource 112. The runtime component 118 can send the translated request to the OData provider 122. The OData provider 122 can retrieve the OData resource 112, using, for example, a domain model and application logic provided by the server application 110, and provide the OData resource 112 to the runtime component 118, in response to the translated request. The runtime component 118 can provide the OData resource 112 to the HTTP handler 116. The HTTP handler 116 can create a HTTP response that includes the OData resource 112, and send the HTTP response, over the HTTP connection, to the client device 104. The HTTP connection is closed after the HTTP response is sent.

A developer of the client application 108 may desire to establish an asynchronous connection that remains open, with the server application 110, for performance reasons. An always-open connection can have better performance than multiple, single connections that are opened and closed for each request/response. As another example, an open connection can enable the server application 110 to push data to the client application 108 (e.g., server and client roles can be reversed). For example, a server application can proactively push data to a client (e.g., if a client requests a first resource, the server can determine, based on heuristics, that the client may also want/need a second resource. The server can push the second resource to the client or retrieve and cache the second resource, for faster retrieval as compared to an uncached second resource, in anticipation of a client request for the second resource. As another example, an open connection can be used for data streaming, from the server application 110 to the client application 108 (or, in some examples, from the client application 108 to the server application 110).

An open connection that has role flexibility can enable other types of communication. For example, the server application 110 can use the open connection to participate in server-application to server-application communication, with another server application 123. As another example, the server application 110 on the application server 102 can communicate (as a data requester and/or as a data provider) with a server application 124 on another (e.g., the "other") server 105. The application server 102 and the other server 105 each include a web socket handler 126 or 128, respectively. Web socket handlers are described in more detail below.

The web socket handler 126 can receive requests for OData (and other requests) from consuming applications. Consuming applications can include the client application 108, the server application 110, the server application 124, or the server application 123, among others. For example, the client application 108 can send a request for OData to the server application 110, over a web socket connection. A web socket connection can be created as an upgrade of a HTTP connection, as described below. The request for OData from the client application 108 can be received by the web socket handler 126. The web socket handler 126 can perform similar processing as the HTTP handler 116.

The web socket handler 126 can translate the request received on the web socket connection into the format used by the runtime component 118. The rest of the processing of the translated request can proceed as described above for the translated request generated by the HTTP handler 116. That is, the translated requests generated by the HTTP handler 116 and the web socket handler 126 can be the same (or similar). The runtime 118 and the OData provider 122 can be leveraged for both types of requests. That is, both types of requests can be handled by a same runtime stack.

The runtime component 118 can send the translated request produced by the web socket handler 126 to the OData provider 122. The OData provider 122 can retrieve the OData resource 112 and provide the OData resource 112 to the runtime component 118, which can provide the OData resource 112 to the web socket handler 126. The web socket handler 126 can create a web socket message that includes the OData resource 112, and send the web socket message, over the web socket connection, to the client device 104. The web socket connection can remain open after the web socket message is sent and be ready for another request from the client application 108 or a message from the server application 110.

Asynchronous functionality enabled by the web socket handler 126 can used by new or existing applications. The OData providers 120 do not need to change in order to be used with web socket technology. Backend developers do not need to be concerned over whether a request is received over a HTTP or a web socket connection. An application acting as a client may be configured differently for synchronous HTTP vs. asynchronous web socket connections, but a runtime stack for responding to requests for OData resources can remain unchanged.

A web socket connection can remain open for a lifetime of a session that connects a client and server application. If either the client or the server entity are terminated, the web socket connection connecting the two entities can be closed. The web socket connection can be closed by either the client or the server.

As used in the present disclosure, the term "computer" is intended to encompass any suitable processing device. For example, although FIG. 1 illustrates a single application server 102, a single client device 104, and a single other server 105, the system 100 can be implemented using a single, stand-alone computing device, two or more application servers 102, two or more other servers 105, or two or more client devices 104. Indeed, the application server 102, the other server 105, and the client device 104 may be any computer or processing device such as, for example, a blade server, general-purpose personal computer (PC), Mac®, workstation, UNIX-based workstation, or any other suitable device. In other words, the present disclosure contemplates computers other than general-purpose computers, as well as computers without conventional operating systems. Further, the application server 102, the other server 105, and the client device 104 may be adapted to execute any operating system, including Linux, UNIX, Windows, Mac OS®, Java™, Android™, iOS or any other suitable operating system. According to one implementation, the application server 102 may also include or be communicably coupled with an e-mail server, a Web server, a caching server, a streaming data server, and/or other suitable server.

Interfaces 140, 142, and 144 are used by the application server 102, the other server 105, and the client device 104, respectively, for communicating with other systems in a distributed environment—including within the system 100—connected to the network 106. Generally, the interfaces 140, 142, and 144 each comprise logic encoded in software and/or hardware in a suitable combination and operable to communicate with the network 106. More specifically, the interfaces 140, 142, and 144 may each comprise software supporting one or more communication protocols associated with communications such that the network 106 or interface's hardware is operable to communicate physical signals within and outside of the illustrated system 100.

The application server 102 includes one or more processors 146. Each processor 146 may be a central processing unit (CPU), a blade, an application specific integrated circuit (ASIC), a field-programmable gate array (FPGA), or another suitable component. Generally, each processor 146 executes instructions and manipulates data to perform the operations of the application server 102. Specifically, each processor 146 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The application server 102 includes memory 148. In some implementations, the application server 102 includes multiple memories. The memory 148 may include any type of memory or database module and may take the form of volatile and/or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the application server 102.

The client device 104 may generally be any computing device operable to connect to or communicate with the application server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the application server 102. In some instances, a client application may be an agent or client-side version of the one or more enterprise applications running on an enterprise server (not shown).

The client device 104 further includes one or more processors 150. Each processor 150 included in the client device 104 may be a central processing unit (CPU), an application specific integrated circuit (ASIC), a field-programmable gate array (FPGA), or another suitable component. Generally, each processor 150 included in the client device 104 executes instructions and manipulates data to perform the operations of the client device 104. Specifically, each processor 150 included in the client device 104 executes the functionality required to send requests to the application server 102 and to receive and process responses from the application server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 152.

The GUI 152 of the client device 104 interfaces with at least a portion of the system 100 for any suitable purpose, including generating a visual representation of the client application 108. In particular, the GUI 152 may be used to view and navigate various Web pages. Generally, the GUI 152 provides the user with an efficient and user-friendly presentation of business data provided by or communicated within the system. The GUI 152 may comprise a plurality of customizable frames or views having interactive fields, pull-down lists, and buttons operated by the user. The GUI 152 contemplates any suitable graphical user interface, such as a combination of a generic web browser, intelligent engine, and command line interface (CLI) that processes information and efficiently presents the results to the user visually.

Memory 154 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 154 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the application server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
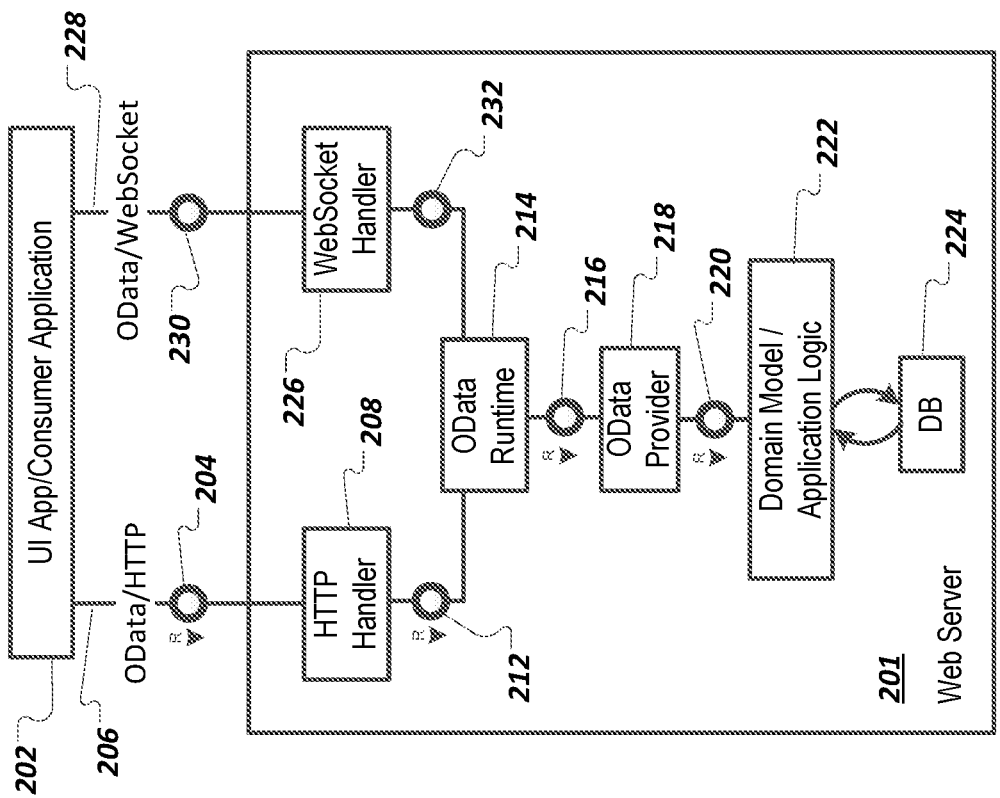
FIG. 2 is a block diagram illustrating an example system for providing an asynchronous transport channel for OData data using web sockets.

FIG. 2 is a block diagram illustrating an example system 200 for providing an asynchronous transport channel for OData data using web sockets. A web server 201 (which may be an application server, or a gateway server) can be currently configured to receive HTTP requests for OData from consuming applications, such as a consuming application 202. Functionality can be added to the web server 201 to enable the web server 201 to also receive requests for OData over a web socket connection, as described below.

The consuming application 202 (e.g., a client application, a user interface application, a server application) can send a HTTP request 204 for an OData resource to the web server 201. A HTTP connection 206 can be established for the HTTP request 204. The HTTP request 204 can be received by a HTTP handler 208 in the web server 201. The HTTP handler 208 can translate the HTTP request 204 into a format compatible with a programming model used by a runtime component 214 (e.g., a gateway runtime component), as illustrated by a translated request 212 sent to the runtime component 214. For example, the HTTP handler 208 can translate information in a request header, a URL (Uniform Resource Locator), and/or a payload portion into a runtime specific request.

The runtime component 214 can forward the HTTP request 204 (e.g., as illustrated by a forwarded request 216) to an OData provider 218. The OData provider 218 can use (or can send a request 220 to) a domain model/application logic component 222. The domain model/application logic component 222 can retrieve data from a database 224 to obtain an OData resource that is responsive to the HTTP request 204. The obtained OData resource can be passed back up a chain of requesters to the HTTP handler 208, which can include the OData resource in a HTTP response and provide the HTTP response to the consuming application 202, over the HTTP connection 206, as a response to the HTTP request 204. The HTTP connection 206 is closed after the response to the HTTP request 204 is sent to the consuming application 202. If the consuming application 202 sends another, new HTTP request, a new HTTP connection is established for the new HTTP request.

To enable asynchronous communication over an open connection, the web server 201 can include a web socket handler 226. A web socket connection 228 can be established between the consuming application 202 and the web socket handler 226 after a request for a web socket connection is sent to the web server 201 by the consuming application 202. For example, an HTTP upgrade request can be sent by the consuming application 202 to the web server 201. The web server 201 can accept the HTTP upgrade request and the web socket connection 228 can be upgraded to a connection that is kept open. In some implementations, the HTTP connection is converted into a TCP (Transmission Control Protocol) connection. As another example, the upgraded connection can use HTTP frames.

The consuming application 202 can send a request 230 for an OData resource over the open web socket connection 228, without establishing a new connection. The web socket handler 226 can translate the request 230 (e.g., as illustrated by a translated request 232) to a format compatible with the programming model used by the runtime component 214, and send the translated request 232 to the runtime component 214. For example, the web socket handler 226 can translate information in a payload portion into a runtime-specific request. The runtime component 214, the OData provider 218, and the domain model/application logic component 222 can process the translated request 232 in the same manner as done for the translated request 212 sent by the HTTP handler 208, to extract and provide the requested OData resource to the web socket handler 226. The web socket handler 226 can include the OData resource in a web socket message and provide the web socket message to the consuming application 202, over the open web socket connection 228. The web socket handler 226 can receive other requests from the consuming application 202 over the same open web socket connection 228, without closing or re-establishing other connections.

Additionally, the web server 201 can proactively push data to the consuming application 202. For example, the domain model/application logic component 222 can determine that an OData resource is to be provided to the consuming application 202. For example, the domain model/application logic component 222 may become aware of and identify new data that may be of interest to the consuming application 202. The identified OData resource can be retrieved by the domain model/application logic component 222 from the database 224 and provided to the OData provider 218, which can in turn provide the identified OData resource to the runtime component 214. The runtime component 214 can provide the identified OData resource to the web socket handler 226. The web socket handler 226 can create a web socket message with the identified OData resource as a payload, and send the web socket message over the open web socket connection 228, to the consuming application 202, without the consuming application needing to request the identified OData resource, and without the establishing of a new connection.

In some implementations, the web server 201 provides a web socket API (Application Programming Interface). The web socket handler 226 can be an implementation of a push channel handler that includes implementations of methods described by the API, including onSend( ), onPublish( ), onMessage( ), onConnect( ), and onClose( ) implementations. The method implementations are called when corresponding web socket events occur in the web server 201.

FIG. 3 illustrates example code 300 that includes a request for a service document and a corresponding response for both HTTP and web socket protocols. A HTTP request 302 is a request for an OData service document. The HTTP request 302 includes a GET command 304, a URL 306 of the service document, and a request header 308. The request body is empty, as indicated by a note 310. A corresponding OData request 312 is a payload that includes a set of key/value pairs. For example, the OData request includes header, type, resource, method, and request-headers keys, with a corresponding value for each key.

A HTTP response 320 can be sent to a consuming application in response to the HTTP request 302. The HTTP response 320 includes a status 322, a response header 324, and a response body 326. Similar to the OData request 312, an OData response 330 includes a payload that includes a set of key/value pairs, for keys of header, type, resource, status, response-headers, and body. A value 314 for the resource key identifies the requested service document.

FIG. 4 illustrates example code 400 that includes a request for an OData resource and a corresponding response for both HTTP and web socket protocols. A HTTP request 402 is a request for an OData resource. The HTTP request 402 includes a GET command 404, a URL 406 of the requested resource, and a request header 408. The request body is empty, as indicated by a note 410. A corresponding OData request 412 is a payload that includes a set of key/value pairs. For example, the OData request 412 includes header, type, resource, method, and request-headers keys, with a corresponding value for each key. A value 414 for the resource key identifies the requested resource.

A HTTP response 420 can be sent to a consuming application in response to the HTTP request 402. The HTTP response 420 includes a status 422, a response header 424, and a response body 426. The response body 426 includes the requested resource. Similar to the OData request 412, an OData response 430 includes a payload that includes a set of key/value pairs, for keys of header, type, resource, status, response-headers, and body. A value 410 for the body key includes the requested OData resource.

FIG. 5 illustrates example code 500 that includes a request to create an OData resource and a corresponding response for both HTTP and web socket protocols. A HTTP request 502 is a request to create an OData resource. The HTTP request 502 includes a POST command 504, a URL 506 that represents the resource to be created, a request header 508, and a request body 510 that includes data to be included in the created resource. A corresponding OData request 512 is a payload that includes a set of key/value pairs. For example, the OData request 512 includes header, type, resource, method, request-headers, and body keys, with a corresponding value for each key. A value 514 for the resource key represents the resource to be created. A value 516 for the body key includes data to be included in the created resource.

A HTTP response 520 can be sent to a consuming application in response to the HTTP request 502. The HTTP response 520 includes a status 522, a response header 524, and a response body 526. The response body 526 includes metadata 527 that describes the resource that was created and an identifier 528 of a record created in the resource. Similar to the OData request 512, an OData response 530 includes a payload that includes a set of key/value pairs, for keys of header, type, resource, method, status, response-headers, and body. A value 532 for the body key includes metadata that describes the created resource and an identifier of a record created in the resource.

Figure 6:
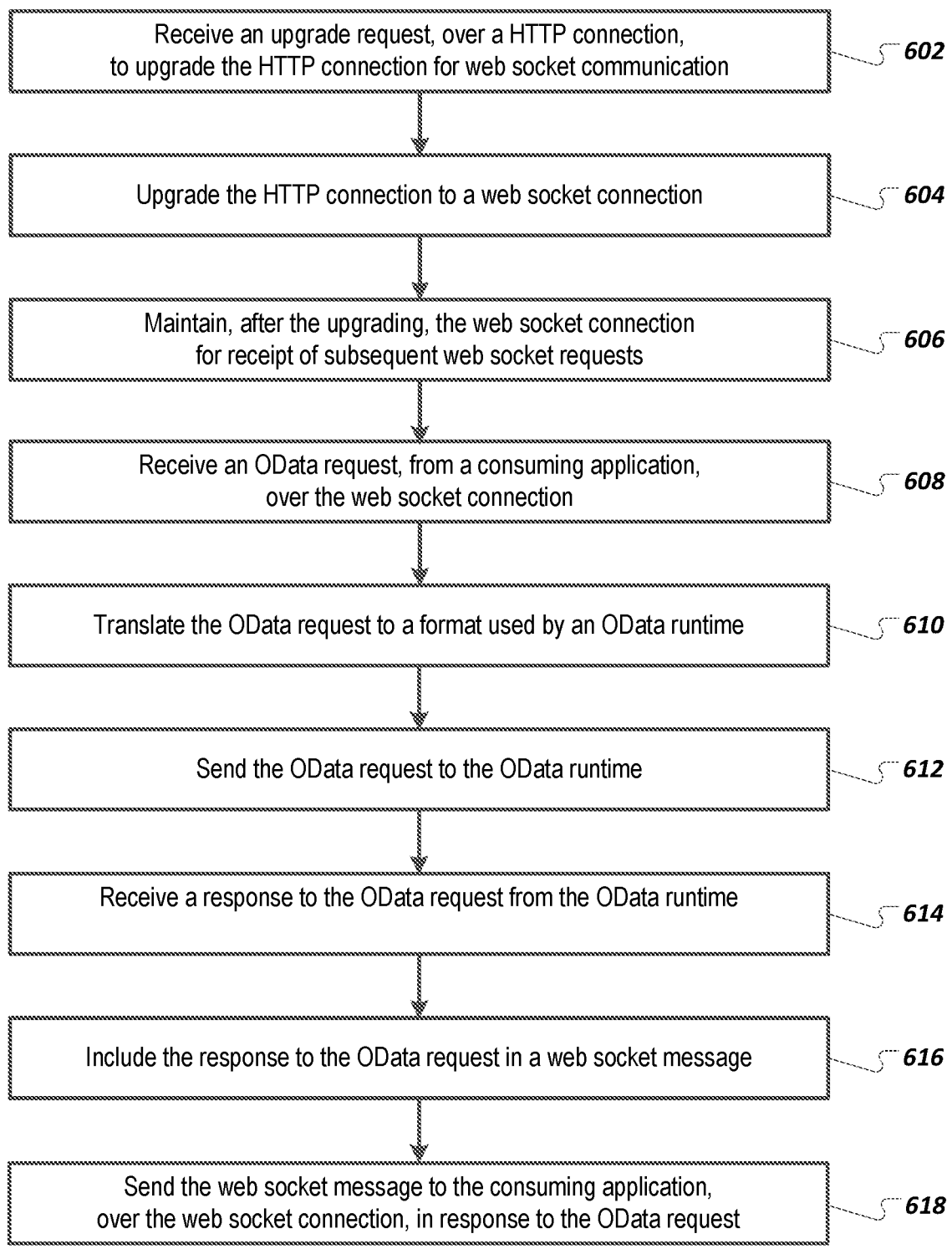
FIG. 6 is a flowchart of an example method for providing an asynchronous transport channel for OData data using web sockets.

FIG. 6 is a flowchart of an example method 600 for providing an asynchronous transport channel for OData data using web sockets. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the web socket handler 126 of FIG. 1.

At 602, an upgrade request is received, over a HTTP connection, to upgrade the HTTP connection for web socket communication.

At 604, the HTTP connection is upgraded to a web socket connection.

At 606, the web socket connection is maintained, after the upgrade, for receipt of subsequent web socket requests.

At 608, an OData request is received, from a consuming application, over the web socket connection. The consuming application can be a client application, a server application on a same server at which the OData request was received, or a different server than the server at which the OData request was received. The OData request can be for one or more OData resources, for adding, editing, or deleting one or more OData resources, for metadata, or for an operation to be performed in the OData runtime. The OData request can be a set of multiple OData requests (e.g., sent as a batch).

At 610, the OData request is translated to a format used by an OData runtime (e.g., a runtime environment).

At 612, the OData request is sent to the OData runtime.

At 614, a response to the OData request is received from the OData runtime. The response can include a requested OData resource, requested metadata, or a response (e.g., a return code) associated with a performed action.

At 616, the response to the OData request is included in a web socket message. The web socket message is formatted for transport over the web socket connection.

At 618, the web socket message is sent to the consuming application, over the web socket connection, in response to the OData request. The web socket connection remains open (e.g., is maintained) after the web socket message is sent to the consuming application.

Although method 600 is described as a request/response scenario, other examples are possible, such as server-push scenarios. For instance, a second OData resource can be received, unsolicited by the consuming application, and from the OData runtime environment. The second OData resource can be a resource targeted to the consuming application. For example, the OData runtime can determine that the second OData resource may be of interest to the consuming application. For example, the second OData resource can be identified based on the first OData request. The second OData resource can be incorporated into a second web socket message and the second web socket message can be sent to the consuming application, over the web socket connection, with the web socket connection remaining open after the second web socket message is sent. As another example, the second OData resource can be received from the OData runtime environment before the first OData request is received (e.g., a server can push information to a consuming application before the consuming application sends an initial OData request). As yet another example, server-push only scenarios are contemplated, where a server pushes data over the web socket connection to a consuming application that does not send OData requests.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a consuming application;
a network; and
a server comprising:
a web socket handler; and
an OData runtime environment;
wherein the web socket handler is configured, when executed by at least one processor, to:
receive, from the consuming application, a first OData request over a web socket connection;
translate the first OData request to a format used by the OData runtime environment;
send the first OData request to the OData runtime environment;
receive a response to the first OData request from the OData runtime environment;
incorporate the response to the first OData request into a first web socket message; and
send the first web socket message to the consuming application, over the web socket connection, in response to the first OData request.

2. The system of claim 1, wherein the OData runtime environment is configured, when executed by the at least one processor, to:
receive the first OData request from the web socket handler;
generate a response to the first OData request; and
send the response to the first OData request to the web socket handler.

3. The system of claim 1, wherein the web socket handler is configured, when executed by the at least one processor, to maintain the web socket connection for receipt of web socket requests from the consuming application.

4. The system of claim 1, wherein the first OData request is for a first OData resource.

5. The system of claim 4, wherein the OData runtime environment is configured to:
forward the first OData request to an OData provider; and
receive the response to the first OData request from the OData provider.

6. The system of claim 5, wherein the OData runtime environment is configured to:
receive a second OData request, from a HTTP handler, wherein the second OData request is sent over a HTTP connection and is the same as the first OData request;
forward the second OData request to the OData provider;
receive a response to the second OData request from the OData provider; and
provide the response to the second OData request to the HTTP handler.

7. The system of claim 4, wherein the response to the first OData request includes the first OData resource.

8. The system of claim 1, wherein the first OData request is for an operation to be performed in the OData runtime environment.

9. The system of claim 1, wherein the first OData request is for metadata.

10. The system of claim 9, wherein the OData runtime environment is configured, when executed by the at least one processor, to:
identify, unsolicited by the consuming application, a second OData resource, the second OData resource being a resource targeted to the consuming application; and
wherein the web socket handler is configured, when executed by the at least one processor, to:
receive, from the OData runtime environment, the second OData resource;
incorporate the second OData resource into a second web socket message; and
send the second web socket message to the consuming application, over the web socket connection, wherein the web socket connection remains open after the second web socket message is sent.

11. The system of claim 10, wherein the second OData resource is received by the web socket handler before the web socket handler receives the first OData request.

12. The system of claim 1, wherein the consuming application is an application running on a client device.

13. The system of claim 1, wherein the consuming application is a server application executing on the server.

14. The system of claim 1, wherein the consuming application is a server application on another, different server.

15. A computer-implemented method comprising:
receiving, from a consuming application, a first OData request over a web socket connection;
translating the first OData request to a format used by an OData runtime environment;
sending the first OData request to the OData runtime environment;
receiving a response to the first OData request from the OData runtime environment;
incorporating the response to the first OData request into a first web socket message; and
sending the first web socket message to the consuming application, over the web socket connection, in response to the first OData request.

16. The computer-implemented method of claim 15, wherein the first OData request is for a first OData resource.

17. The computer-implemented method of claim 16, wherein the first OData request is for an operation to be performed in the OData runtime environment.

18. A computer program product encoded on a non-transitory storage medium, the product comprising non-transitory, computer readable instructions for causing one or more processors to perform operations comprising:
receiving, from a consuming application, a first OData request over a web socket connection;
translating the first OData request to a format used by an OData runtime environment;
sending the first OData request to the OData runtime environment;
receiving a response to the first OData request from the OData runtime environment;
incorporating the response to the first OData request into a first web socket message; and
sending the first web socket message to the consuming application, over the web socket connection, in response to the first OData request, wherein the web socket connection remains open after the first web socket message is sent.

19. The computer program product of claim 18, wherein the first OData request is for a first OData resource.

20. The computer program product of claim 19, wherein the first OData request is for an operation to be performed in the OData runtime environment.

* * * * *

UNITED STATES PATENT AND TRADEMARK OFFICE
CERTIFICATE OF CORRECTION

PATENT NO. : 11,689,626 B2
APPLICATION NO. : 17/479628
DATED : June 27, 2023
INVENTOR(S) : Tatjana Pfeifer and Andreas Hoffner It is certified that error appears in the above-identified patent and that said Letters Patent is hereby corrected as shown below:

On the Title Page

In Column 1, Item (72), In Inventors:
Delete "Tatjiana Pfeifer" and
Insert -- Tatjana Pfeifer --, therefor.

Signed and Sealed this
Seventh Day of May, 2024

Katherine Kelly Vidal
*Director of the United States Patent and Trademark Office*